US009325519B2

(12) United States Patent
Lezama Bounine (10) Patent No.: US 9,325,519 B2
(45) Date of Patent: Apr. 26, 2016

(54) DISTRIBUTED PROXY FOR BI-DIRECTIONAL NETWORK CONNECTIVITY OVER POINT-TO-POINT CONNECTION

(75) Inventor: Damian C. Lezama Bounine, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 309 days.

(21) Appl. No.: 13/252,283

(22) Filed: Oct. 4, 2011

(65) Prior Publication Data

US 2013/0083800 A1    Apr. 4, 2013

(51) Int. Cl.
| | | |
|---|---|---|
| H04L 12/54 | (2013.01) | |
| H04L 12/28 | (2006.01) | |
| G06F 15/16 | (2006.01) | |
| H04L 12/851 | (2013.01) | |
| H04L 12/801 | (2013.01) | |

(52) U.S. Cl.
CPC ........ *H04L 12/2859* (2013.01); *H04L 47/2433* (2013.01); *H04L 47/34* (2013.01)

(58) Field of Classification Search
USPC .................................. 370/235–240, 389–401
See application file for complete search history.

(56) References Cited

U.S. PATENT DOCUMENTS

| | | | |
|---|---|---|---|
| 7,673,048 | B1 | 3/2010 | O'Toole, Jr. et al. |
| 2005/0047421 | A1* | 3/2005 | Solomon ........................ 370/399 |
| 2009/0228742 | A1 | 9/2009 | Lewallen |
| 2009/0271566 | A1* | 10/2009 | Arman ........................... 711/103 |
| 2010/0002698 | A1* | 1/2010 | Clack et al. .................... 370/390 |
| 2010/0014459 | A1 | 1/2010 | Mir et al. |
| 2010/0250769 | A1* | 9/2010 | Barreto et al. ................. 709/231 |
| 2010/0267368 | A1 | 10/2010 | Masputra |
| 2011/0032914 | A1 | 2/2011 | Venkateswaran et al. |
| 2011/0071841 | A1* | 3/2011 | Fomenko et al. .............. 705/1.1 |
| 2011/0112969 | A1 | 5/2011 | Zaid et al. |
| 2012/0008521 | A1* | 1/2012 | Moncaster et al. ........... 370/252 |

OTHER PUBLICATIONS

Kang, et al., "Mobile Peer Membership Management to Support Multimedia Streaming", Retrieved at <<http://citeseerx.ist.psu.edu/viewdoc/download?doi=10.1.1.7.1910&rep=rep1&type=pdf, ICDCSW '03 Proceedings of the 23rd International Conference on Distributed Computing Systems, May 19, 2003, pp. 6.
Delsing, et al., "Mobile Internet Enabled Sensors using Mobile Phones as Access Network", Retrieved at <<http://www.itcon.org/data/works/att/2004_27.content.04159.pdf>>, ITcon vol. 9 (2004), Aug. 2004, pp. 381-388.

* cited by examiner

*Primary Examiner* — Brandon Renner
(74) *Attorney, Agent, or Firm* — Sunah Lee; Judy Yee; Micky Minhas (57) ABSTRACT

The subject disclosure is directed towards a technology by which computing devices such as a phone and a personal computer may reliably communicate internet protocol (IP)-based network data to one another via an unreliable point-to-point data transfer mechanism such as a USB connection. To this end, each computing device includes a bi-directional proxy component (e.g., a proxy and reliable transfer tunnel), that processes network data into packets for transmission over the point-to-point connection, and processes received packets into internet protocol (IP)-based network data for a network connection. Also described are an acknowledgement and sequence number-based mechanism that ensures reliable point-to-point data transfers, and a flow control mechanism that prevents a recipient from receiving more data than it can handle until ready.

20 Claims, 9 Drawing Sheets

DISTRIBUTED PROXY FOR BI-DIRECTIONAL NETWORK CONNECTIVITY OVER POINT-TO-POINT CONNECTION

BACKGROUND

There are various ways to connect a mobile device to a personal computer or other device. One such way is via a point-to-point connection, such as over USB (Universal Serial Bus). A network connection is more difficult, because mobile devices are not configured with a network card/Ethernet coupling, and wireless connections go through an intermediary such as a wireless router.

However, certain applications such as debuggers are not configured to use point-to-point connections, as they are based upon having an IP (Internet Protocol)-based network connection between devices. Such a network connection relies on its respective device's network stack, which means that concepts such as firewalls, network address translation components, antivirus components and other components usually present in PCs and networks are part of the connection, unlike point-to-point connections.

Further, network connections need to reliably transfer data. Data transfer over point-to-point connections such as USB bulk transfer is not sufficiently reliable.

Past solutions that attempted to communicate IP data over a point-to-point connection such as RNDIS (Remote Network Driver Interface Specification) had compatibility problems, while Serial-DTPT (Desktop Pass-through) was technically complex, slow, and cost ineffective. These solutions also proved to be unreliable on the presence of errors in the transport (e.g., USB errors).

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a first computing device such as a phone is coupled to a second computing device, such as a personal computer, via a point-to-point connection. Each computing device includes a bi-directional proxy component configured to process internet protocol (IP)-based network data for transmission over the point-to-point connection via a reliable protocol, and to process data received over the point-to-point connection into internet protocol (IP)-based network data for transmission to a network connection.

In one aspect, the point-to-point connection corresponds to an unreliable transfer mechanism such as USB, and the reliable protocol comprises an acknowledgment (ACK) mechanism configured to return an ACK from the second computing device to the first computing device only if the data is correctly received at the second computing device, e.g., based upon a sequence number and/or a checksum.

In one aspect, a flow control mechanism is provided, in which the computing device that receives data over the point-to-point connection returns information to the first computing device that indicates when received data has been delivered to a network recipient, and thus that a network buffer is available for buffering more data received via the point-to-point connection. For example, the first proxy component may maintain a counter of buffers available at the second device, and hold data so as to only send more data when the counter indicates that at least one buffer is available to handle more data.

In one aspect, data corresponding to a reliable protocol is received and processed into a data transfer container for transmission over an unreliable point-to-point connection transfer mechanism, including associating an identifier with the data transfer container. The data is reliably sent over the unreliable point-to-point connection by checking for an acknowledgement (ACK) that indicates that the container was correctly received, and if the ACK is not received, re-sending the data transfer container (or at least part thereof, e.g., in a more granular system).

The data transfer container may comprise a packet, with the identifier comprising a packet sequence number. A plurality of commands may be placed into the packet, with at least one command comprising a command code that represents the command and a command tag that represents a stream for transferring a set of data. Command-specific data also may accompany a command. Another packet may include information that indicates that an ACK is not to be returned for the other data transfer container, (e.g., a zero sequence number).

In one aspect, a recipient device receives a packet of data over an unreliable point-to-point connection transport from a sender, and determines whether the packet was correctly received. If so, an acknowledgement is sent to the sender in response, and the received data is processed into Internet protocol network data that is sent over a network connection. If at the sender that processed received Internet protocol network data into the packet of data, the corresponding ACK was not received within a timeout time, the packet is re-sent.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a technology that provides a high-quality IP channel over a point-to-point connection, such as a USB connection, between endpoint devices such as a mobile phone and a personal computer, in a manner that provides compatibility, reliability and performance. To this end, a bi-directional proxy is distributed to each device that couples each network stack to point-to-point connection components, e.g., various USB-related components. A reliable protocol is used for data transfers between the proxies.

It should be understood that any of the examples herein are non-limiting. For example, while USB or the like (such as connections based upon IEEE 1394 interfaces) is primarily used in the examples and description herein, at least some of the concepts described herein are applicable to provide connectivity between peers, provide network sharing in both directions, and so forth. Also, other low latency transports may be used instead, for example emulators that use shared memory (e.g., DMA) or another communication mechanism between the emulator and the host. Higher latency transports may also be used, and high speeds can be obtained over them by using more and larger buffers. As used herein, "point-to-point connection" refers to any such coupling, including a USB/1394 connection, a shared memory connection into a virtual device, a tunnel over a network into a remote computer, and so forth, whether the coupling is considered mostly direct (such as shared memory) or indirect to an extent (such as a USB connection via a USB hub).

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data communications in general.

Figure 1:
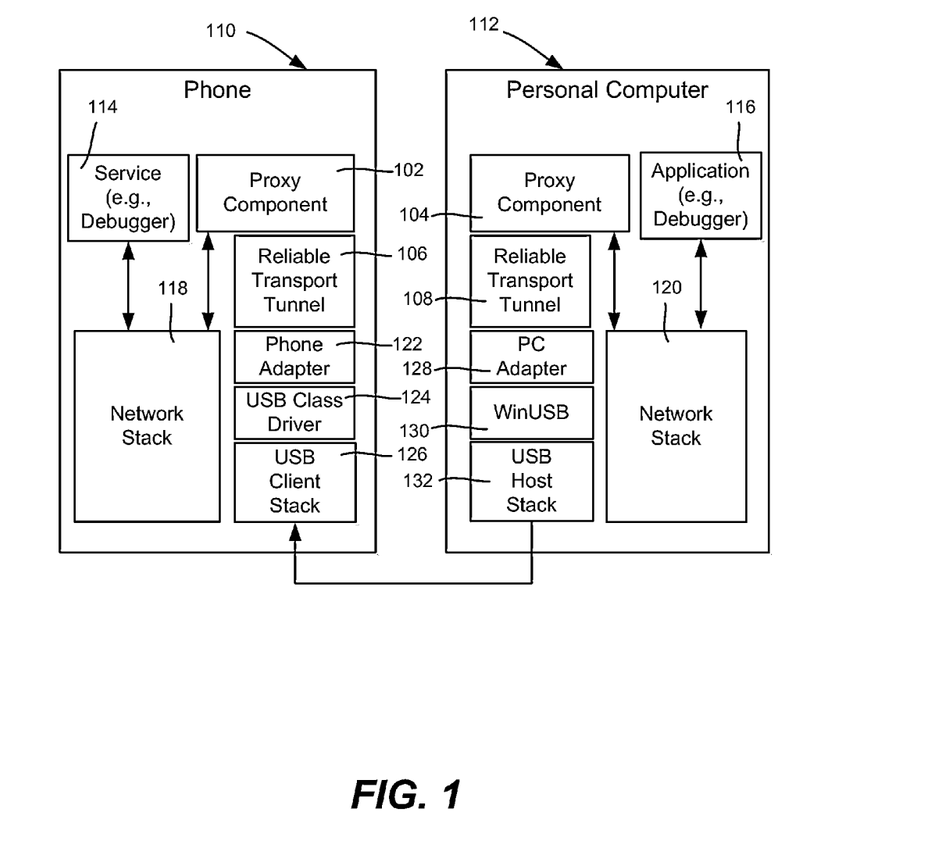
FIG. 1 is a block diagram representing example components of one example implementation having distributed proxy components to provide bi-directional network connectivity over a point-to-point connection.

FIG. 1 is a block diagram showing various components in one example implementation. In general, FIG. 1 exemplifies the concept of distributing a bi-directional network proxy via two proxy components 102 and 104, over a transport tunnel 106 and 108, respectively, to provide connectivity using network protocols like TCP. The proxy components 102 and 104 may be symmetrical or asymmetrical, such as in terms of their structure and functionality.

In general, the proxy components 102 and 104 are responsible for handling network connections, configuring the transport tunnels 106 and 108 for each connection, and forwarding the data. In one embodiment, a distributed implementation of the SOCKS protocol is integrated within this layer. The SOCKS commands are processed by the remote end. SOCKS client logic is used in the local end when establishing connections for pre-configured mapped ports.

The reliable transport tunnels 106 and 108 are responsible for multiplexing and forwarding traffic between local and remote network connections. Forwarding through the USB channel includes implementing a reliability mechanism to reliably deliver the data in the event of any USB errors, for example, as described below.

In the example of FIG. 1, a phone 110 with the proxy component 102 is coupled to a personal computer 112 with its respective proxy component 104. As can be seen in this example, a service 114 on the phone 110 is communicating with an application 116 on the personal computer 112, for debugging some program on the phone. As can be readily appreciated, in addition to debuggers, other tools such as diagnostic tools, remote access to the phone configuration and media sync may be used in a similar way. Note that user mode debugger and development tools such as WPCon connect via personal computer-to-phone TCP connections.

The service is configured to use a network stack 118 comprising software loaded in the phone 110, and the application 116 is configured to use the personal computer's network stack 120. However, because the phone does not have a network card coupled to the stack 118, there is no straightforward way to couple the network stacks 118 and 120 to each other by a wired Ethernet connection; (at the same time, wireless networking is complicated, because any coupling is indirect, e.g., through a wireless router/access point).

As described herein, the network stacks 118 and 120 have a local interface, used by the respective proxy component 102 and 104, which each handle the routing of the IP traffic via a reliable transport tunnel as described herein. In FIG. 1, the phone's reliable transport tunnel 106 is shown as configured for use with a phone adapter 122, USB class driver 124 and USB client stack 126, which are components that may be loaded on a Windows®-based phone. The phone adapter 122 presents a common API to the reliable transport tunnel 106 layer atop the phone's USB class driver 124. The USB class driver 124 exposes USB pipe Read/Write operations and Attach/Detach events to user mode programs.

Similarly, the personal computer's reliable transport tunnel 108 is shown as configured for use with a PC adapter 128, WinUSB component 130 and USB host stack 132, which are components that may be loaded on a Windows®-based personal computer. The PC adapter 128 presents a common API to the reliable transport tunnel 108 layer on top of WinUSB component 130. The WinUSB component 130 is used for accessing the USB host stack 132 in the PC. To locate the phone, a function Discovery API enumerates connected phones in the personal computer 112 and provides for Add/Remove notifications. A lightweight USB class driver 124 in the phone provides basic Read/Write and Attach/Detach functionality. This driver may be generic enough for other USB protocols, such as Media Transfer Protocol, (MTP) to reuse it. As is understood, these are only example components, and other mobile device and personal computer operating systems may be used with similar components to provide the technology described herein.

FIG. 1 thus exemplifies one implementation of how the invention may be used to debug a program in the phone, such as using a standard remote debugger that uses the TCP protocol; because of the distributed bi-directional proxy solution, the application and service may communicate as if there was a physical network card coupling the network stacks. Inter-process communication mechanisms like RPC may be used for retrieving state information from the proxy components 102 and 104 in order to discover the connected devices (or PC) and enumerate the ports they provide for accessing different services. A standard SOCKS protocol may be used, e.g., versions 4 and 4a. Configurable direct destinations (mapped ports) may be provided on top of the SOCKS layer. Asynchronous socket operations and a system thread pool may be used in the service to handle all networking operations. A retransmission mechanism provides reliability over USB, as described below.

As also described below, flow control messages per connection, independent of the USB retransmission mechanism, may be used to keep the network buffer size constant. Multiple overlapped transfers may be issued concurrently on the networking and USB ends to keep the controllers busy while the CPU is not available to the user mode code.

Figure 2:
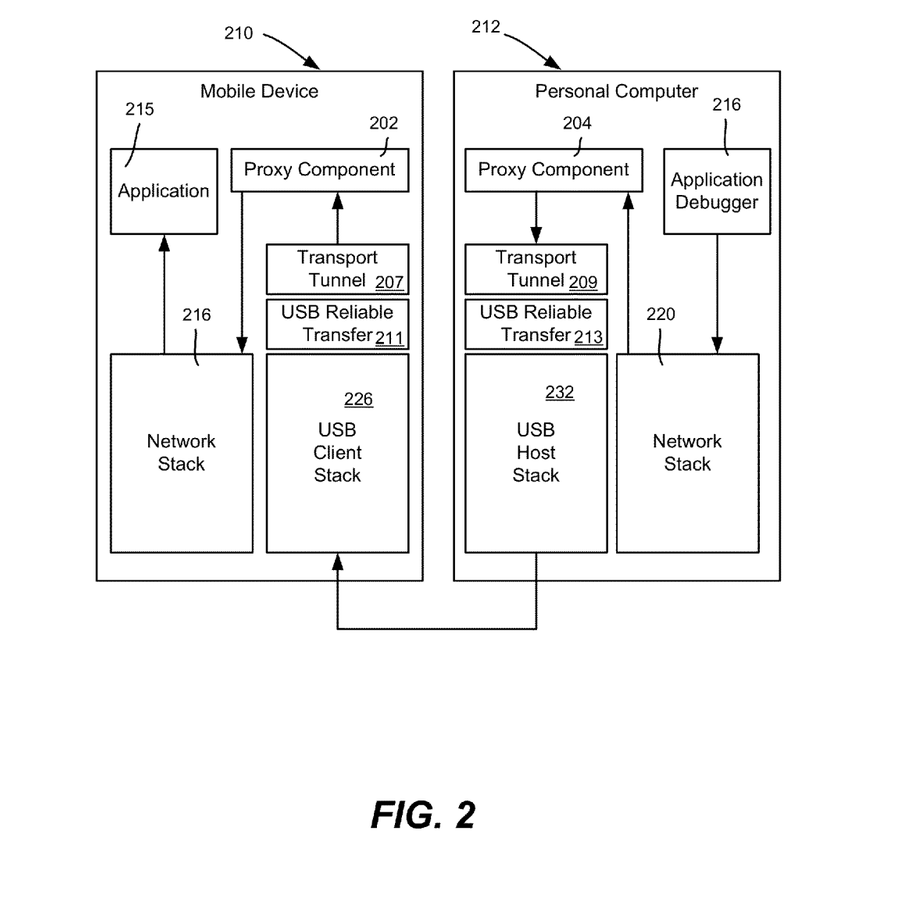
FIG. 2 is a block diagram representing example components of an alternative example implementation having distributed proxy components to provide bi-directional network connectivity over a point-to-point connection.
Figure 3:
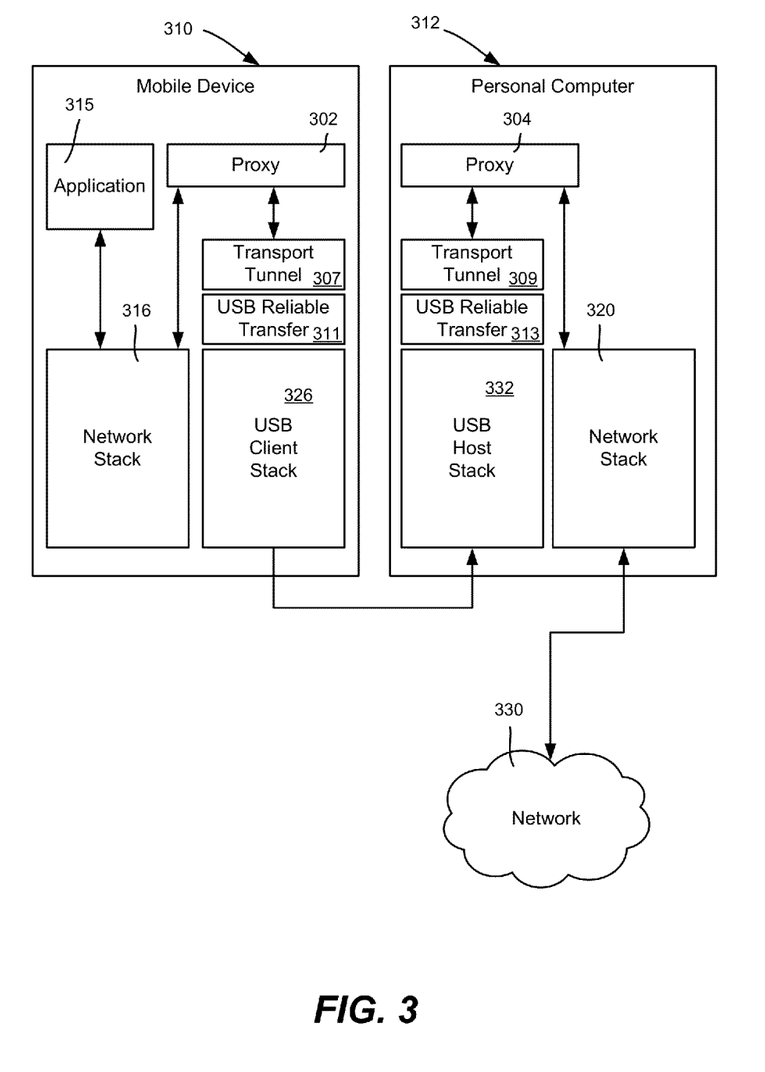
FIG. 3 is a block diagram representing example components of an alternative example implementation distributed proxy components to provide bi-directional network connectivity over a point-to-point connection, for use to connect to another network.

FIGS. 2 and 3 show similar configurations to that of FIG. 1, in which like numerals to those of FIG. 1 are represented by 2xx and 3xx, respectively, instead of 1xx. In FIG. 2, the reliable transport tunnels shown as transport tunnel components 207, 209 and USB reliable transfer components 211 and 213 for a mobile device 210 and personal computer 212, respectively. Adapters and drivers are not shown for purposes of simplicity, and may be considered part of the USB client stack 226 and USB host stack 232. FIG. 2 shows using a USB connection to debug an application 215 in the phone using a standard remote debugger 216, e.g., one that uses TCP protocol.

FIG. 3 shows providing network connectivity to a phone using the personal computer's network 330, sometimes commercially referred to as "reverse tethering." This allows sharing the personal computer's Internet connection with a mobile device 310. Similarly, (not separately shown), the mobile device's network connectivity may be shared with a personal computer or other device, sometimes commercially referred to as "tethering."

Using FIG. 2 for an example and turning to the layered components, namely the distributed proxy components 202 and 204, transport tunnel components 207 and 209 and USB reliable transfer component 211 and 213, the layers facilitate modularity. However, as can be readily appreciated, such layers may be combined into a lesser number of layers, or further divided into a larger number of layers; (indeed, the transport tunnel components and USB reliable transfer components are combined into reliable transport tunnels 106 and 108 in the example of FIG. 1).

The transport tunnel layer components 207 and 209 multiplex multiple streams over a single channel that is considered reliable. The extent of coupling between this layer and the USB reliable transfer layer components 211 and 213 may be dependent on how the transport works (for example a stop-and-wait mechanism versus a sliding window mechanism).

The USB reliable transfer layer components 211 and 213 provide reliable transfers to the transport tunnel layer as described below. In low latency protocols with large transfer sizes, a stop-and-wait mechanism may be sufficient to provide good performance. A bi-directional protocol using two channels is described below.

The distributed proxy components 202 and 204 provide networking connectivity in a way that is compatible with firewalls, NATs, antivirus and other components that are often present in personal computers and networks. For this purpose, standard proxy protocols may be used, including (but not limited to) SOCKS4, SOCKS4a, SOCS5, HTTP, and Static Port Mapping, for example. However, as is understood, the protocols are used in a non-standard way, namely making both sides of the proxy distributed (e.g., symmetrical) and creating a distributed entity that looks like a proxy from both ends.

With respect to phone-to-personal computer connections, with mapped ports for transparent connections, ports in the personal computer 212 can be reached from non-proxy aware applications in the phone by connecting to configured phone local ports. For non-transparent SOCKS connections, applications can implement SOCKS logic and request a connection to "localhost" or 127.0.0.1 on the personal computer 212. For transparent SOCKS connections, support for the interface can enable such connections, subject to discovering a valid personal computer address or forcing a local address to go through this connection.

For personal computer-to-mobile device TCP connections, with mapped ports for transparent connections, ports on the personal computer can be mapped to known phone destinations. For example, this allows connecting a user mode debugger in the personal computer to the debugger service on the phone through a personal computer local port. With non-transparent SOCKS connections, a port in the personal computer can be configured to allow SOCKS-aware applications in the personal computer to connect to arbitrary listening ports on the phone. For transparent SOCKS connections, besides configuring a SOCKS port on the personal computer, networking hooks are used in the network stack (note that there are known solutions for this).

For phone-to-cloud TCP connections, using the personal computer as a gateway (PassThrough/reverse tethering as in FIG. 3), with mapped ports for transparent connections, the mechanism hands off the traffic to the personal computer's network proxies (if present). The configuration of these proxies is detected on the personal computer and pushed to the phone or configured manually by the user. For non-transparent SOCKS connections, phone applications implement SOCKS logic and request a connection to the desired Internet sites. For transparent SOCKS connections, transparent SOCKS proxy support is provided from networking, with the proxy configuration pushed from the personal computer to the phone or manually configured by the user.

For personal computer-to-cloud TCP connections using the phone as a gateway (tethering), with mapped ports for transparent connections, ports on the personal computer may be mapped to point to fixed Internet destinations through the phone. For non-transparent SOCKS connections, if a SOCKS port is configured in the personal computer and a program with SOCKS client capabilities (like a browser) is pointed to the port, the port can be used to access the Internet through the phone. For transparent SOCKS connections, support for SOCKS is added to the personal computer's networking stack (note that there are known solutions for this).

Turning to transferring data, various buffers, packets and other mechanisms are used to accomplish efficient and reliable transfers as described herein. In general, network data is buffered and assembled into commands; while a transfer (e.g., USB) packet typically corresponds to multiple commands, parameters/identifiers for each command, and any data for the command. Data from a relatively large number of network buffers may be present in a single transfer. A transfer typically corresponds to a transfer packet including multiple commands, e.g., a USB write buffer contains multiple commands in its transfer packet, with an ACK command generated per transfer sequence number as described below.

Figure 4:
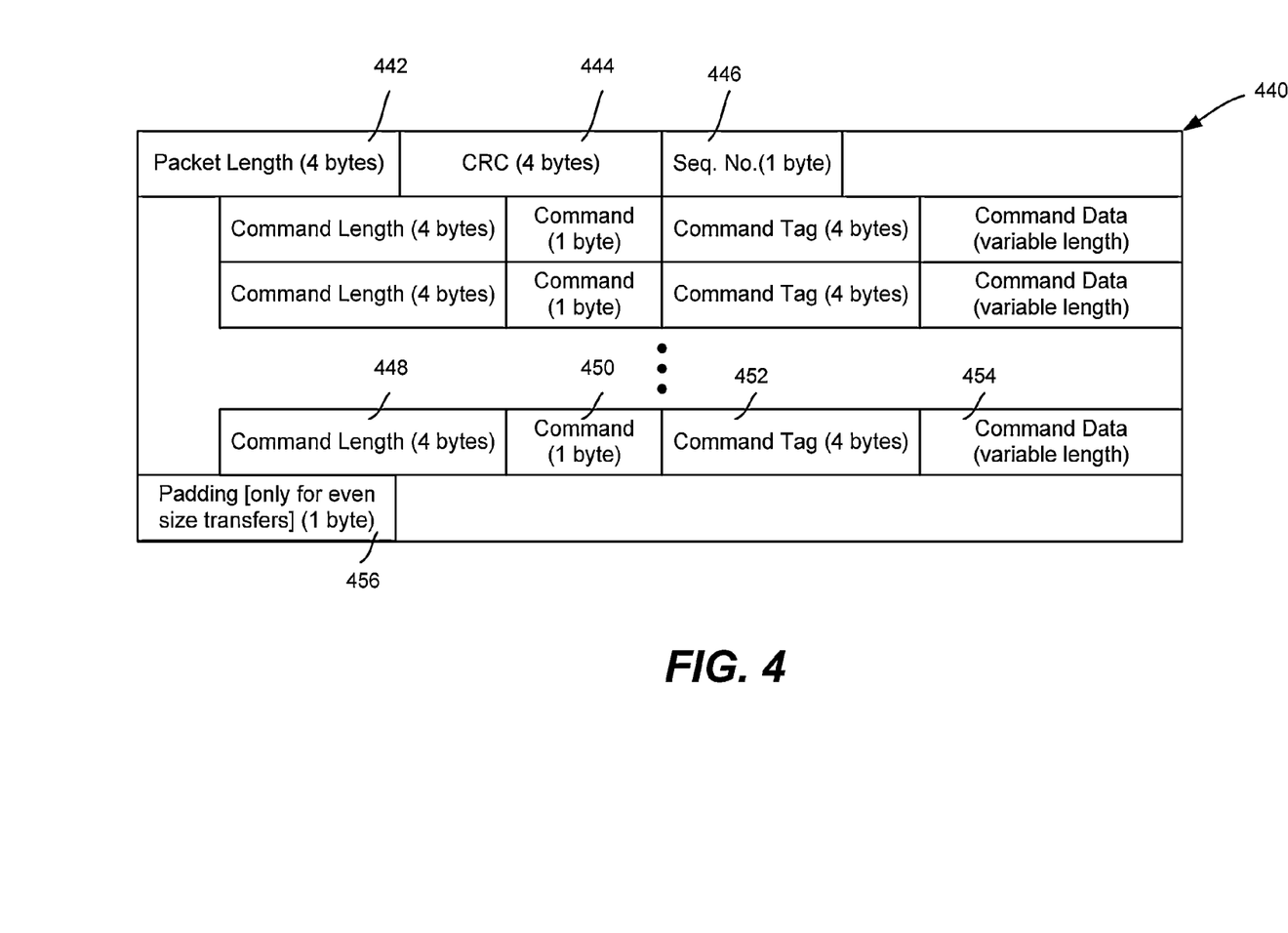
FIG. 4 is an example representation of a packet useable for reliable data transfers over an unreliable point-to-point connection.

FIG. 4 shows a suitable example packet 440 that may be used for transferring commands and accompanying data to from one device to a partner device. In FIG. 4, the illustrated blocks representing the various packet fields are arranged for visual understanding, and thus have what appear to be gaps, but in a typical implementation the fields are contiguous. Also, the blocks representing the various packet fields are not shown to scale, and instead the sizes (one byte, four bytes or variable length) for one implementation are shown in each field.

The packet length field 442 comprises the total length of the packet excluding any padding byte. The packet length matches or is smaller than the transfer size reported by the transport (for example the number of bytes read by WinUSB); if the reported transfer size is less than the packet header size (e.g., nine (9) bytes in this example) or less than the packet header length field, the transfer is ignored.

A checksum also may be used to ensure that each packet is not corrupted. For example, a CRC32 checksum of the packet may be computed by the lowest layer right before sending the packet, when no other modification is necessary. In one implementation, packets with a wrong CRC in the exemplified CRC field 444 are discarded at the receiving end, without sending an ACK, thereby causing a retransmission. In the event that the underlying transfer mechanism (e.g., USB) has other means to ensure that incorrect data cannot be delivered, the CRC32 checksum may be disabled or removed to improve performance.

The sequence number depicted in field 446 is used to detect duplicated or lost packets for the transfers. In one implementation, the maximum number of pending transfers, given by the number of partner transfer buffers, can be at most half of the maximum sequence number (e.g., 255) in order to be able to differentiate between a past and a future transfer. A value of zero ("0") in the sequence number field indicates that the packet does not have any reliable payload (e.g., the packet only has ACK or Handshake commands) and hence an ACK is not sent in return. A zero sequence number also is not checked for having to be in the correct sequence; further, when sent, such a packet may be placed into a particular buffer that is available even when other buffers are full, as described herein such that ACKs can be sent for use in freeing up the other relevant buffers on the other end.

Each command length field (e.g., 448) comprises the length in bytes of the command and its accompanying tag and data (if any). The length is followed by a command field (e.g., 450) that contains a command code. The command tag field (e.g., 452) comprises a command-specific parameter, such as a stream identifier, and the command data field (e.g., 454) comprises variable length command-specific data (if any). Padding may be used (field 456) such that transfers of certain lengths that may create problems in the underlying transport are padded with one or more bytes.

One example command code corresponds to an OpenStream command, which opens a new stream to create a new remote connection. The proxy layer can use one of these streams for each TCP connection. The command tag field contains a stream identifier, e.g., sequentially generated for each new stream; no data is sent in the command in one implementation. CloseStream closes the stream, whereby the corresponding connection is destroyed; the command tag field contains the stream identifier, and no data is sent in the command in one implementation.

Another example command code corresponds to a StreamWrite command, which is used for data received locally that is to be transferred over the point-to-point connection for delivery to the network via the other partner. The command tag field contains the stream identifier. The data comes after the command header and its size may be calculated from the command length field.

Another command is StreamWriteShutdown, which shuts down the network sender. The command tag field contains the stream identifier; no data is sent in the command.

A flow control mechanism, described herein, uses a command referred to as DataDelivered. In general, when received back at the initial sender, this means that data for the stream was delivered to the network, or at least placed in the system network buffers, and hence other data may now handled at the receiver. The command tag field contains the stream identifier; no data is sent in the command.

An acknowledge (ACK) command means that a transfer packet was received and processed. The command tag field contains the packet sequence number being acknowledged. No data is sent with the command.

A handshake command packet includes version, identification and configuration information. The command tag is set to zero (0) unless the handshake command is sent as a reply to a received handshake. In one implementation, the data for the command includes a GUID (16 bytes), version identifier (4 bytes), transfer buffers (4 bytes), transfer buffer size (4 bytes), connection buffers (4 bytes) and connection buffer size (4 bytes).

Turning to a suitable reliable point-to-point transfer protocol, USB bulk transfers are mostly reliable, but can experience errors, which is incompatible with network requirements. As described herein, a reliable protocol that is based upon sequence numbers, acknowledgements (ACKs), and timeout-based retransmission if no ACK is received, is provided. Note that when handling USB errors in one implementation, there are two configurable time values available, namely a timeout when waiting for an ACK on a successful USB write, and a time value of how long to wait before retrying an unsuccessful transfer. Example values and their defaults are 500 milliseconds.

One implementation of a suitable protocol uses a packet oriented bi-directional channel. This channel may be a USB connection using two bulk pipes (one for each direction). Each read operation returns the data for a single write operation on the other end and no less than that, reporting as the transfer length at least the number of bytes actually transferred.

Figure 5:
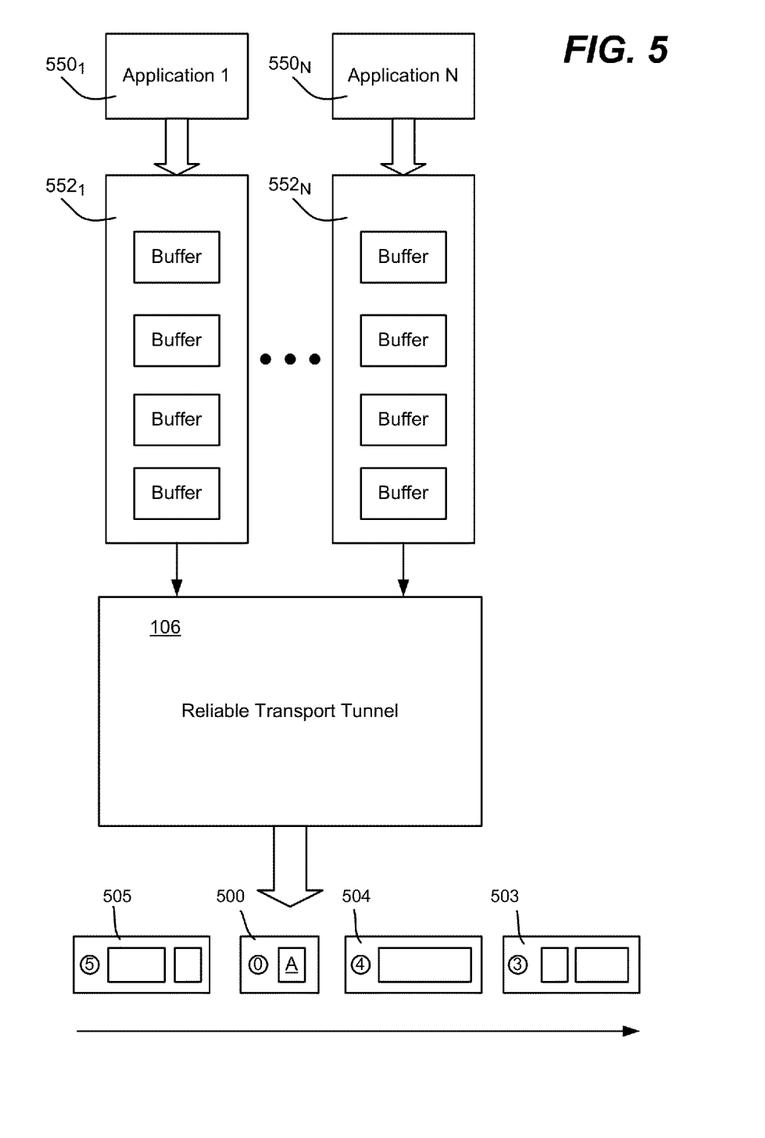
FIG. 5 is an example representation of processing buffered network data into data transfers over a point-to-point connection.

FIG. 5 is a high level diagram showing how a plurality of applications $550_1$-$550_N$ have their network data buffered into sets of buffers $552_1$-$552_N$ for sending to a partner device. Note that the other partner sends its transfers in a similar manner, e.g., two channels are used to provide bi-directionality (although more than one channel in each direction may be present in alternative embodiments).

A reliable transport tunnel (e.g., 106, FIG. 1, or the separated components of FIGS. 2 and 3) processes the buffers into transfers (packets 500 and 503-505) typically containing a plurality of commands. These packets 500 and 503-505 include sequence numbers as described above, shown in FIG. 5 via the circled numeral within each packet. Commands are shown as rectangles within the packets, shown as different sizes to emphasize their variable size as also described above. The rectangle shown with an "A" represents an ACK command in a packet, which has a zero (0) sequence number in this example. Note that ACK commands can be included in regular packets when convenient; in that event, the packet has a non-zero sequence number, as usual. Also more than one ACK command can be bundled in a single transfer. If only ACK commands are present in the packet, the sequence number is zero (0).

Figure 6:
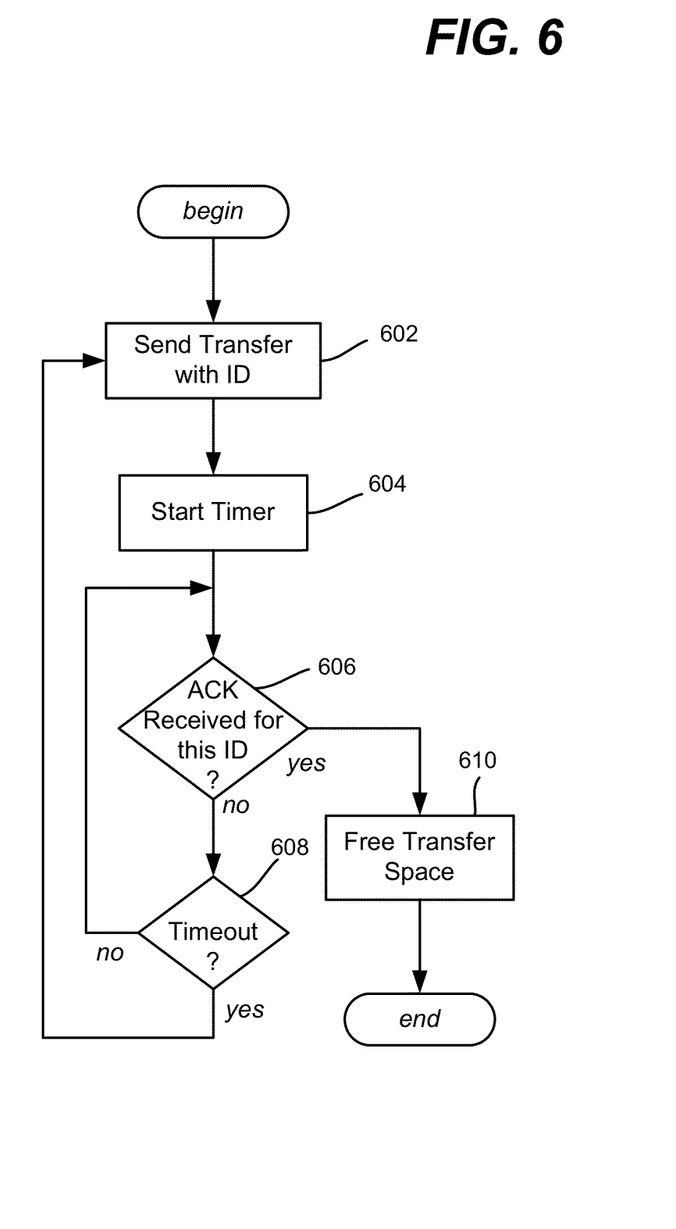
FIG. 6 is a flow diagram representing example steps taken by a data sender for providing a reliable data transfer according to an example protocol.

FIG. 6 is a flow diagram showing example steps with respect to a transfer from the sender's perspective. In general, each transfer is sent with an identifier at step 602, which may be the packet sequence number if a transfer corresponds to one packet. Step 604 starts an ACK timer for this transfer. If an ACK for this transfer ID is received (step 606) within a timeout time (step 608), the step 610 frees the space that buffered the transfer. Otherwise the transfer is re-sent. Note that it is feasible to have a more granular acknowledgement mechanism, e.g., an ACK per command, however in one implementation, efficiency is obtained by having an ACK sent for each transfer.

Figure 7:
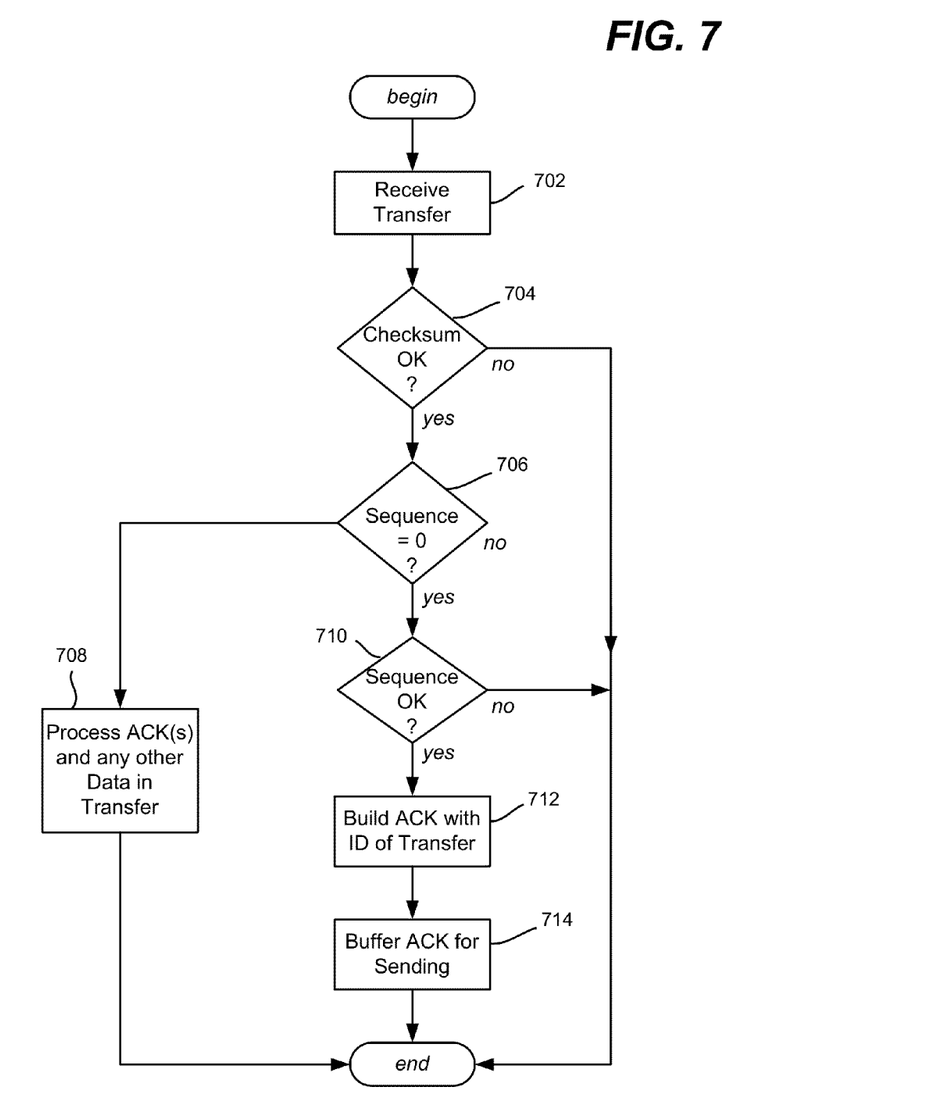
FIG. 7 is a flow diagram representing example steps taken by a data receiver for providing a reliable data transfer according to an example protocol.

FIG. 7 shows the receiving partner's example steps, beginning at step 702 where the transfer is received, which in this example is processed as a single packet. If the packet checksum is correct at step 704, the processing continues, otherwise the packet is corrupt and the transfer is discarded as if the packet was never received.

If the checksum is OK at step 704, the packet is checked for the special zero (0) sequence number, indicating that it is an unreliable packet containing one or more ACKs or handshake data. If so, the packet is processed at step 708, e.g., any ACKs are handled (as in FIG. 6), along with any handshake data.

If a non-zero sequence number, the sequence is checked at step 710 for whether it is correct. If not, the packet is discarded. If the sequence is correct, then an ACK for the packet is built at step 712, and at step 714, the ACK is buffered for sending in a data transfer as generally described herein. Thus, (for a non-zero sequence number), if the sequence or checksum are not both correct, no ACK is sent, whereby the transfer will be re-sent as described above with respect to FIG. 6. Note that it is feasible to have a negative acknowledgment (NACK) solution in an alternative implementation, however having an ACK or no-ACK model as described in FIGS. 6 and 7 is straightforward and efficient enough in transports with low loss and error rates.

Figure 8:
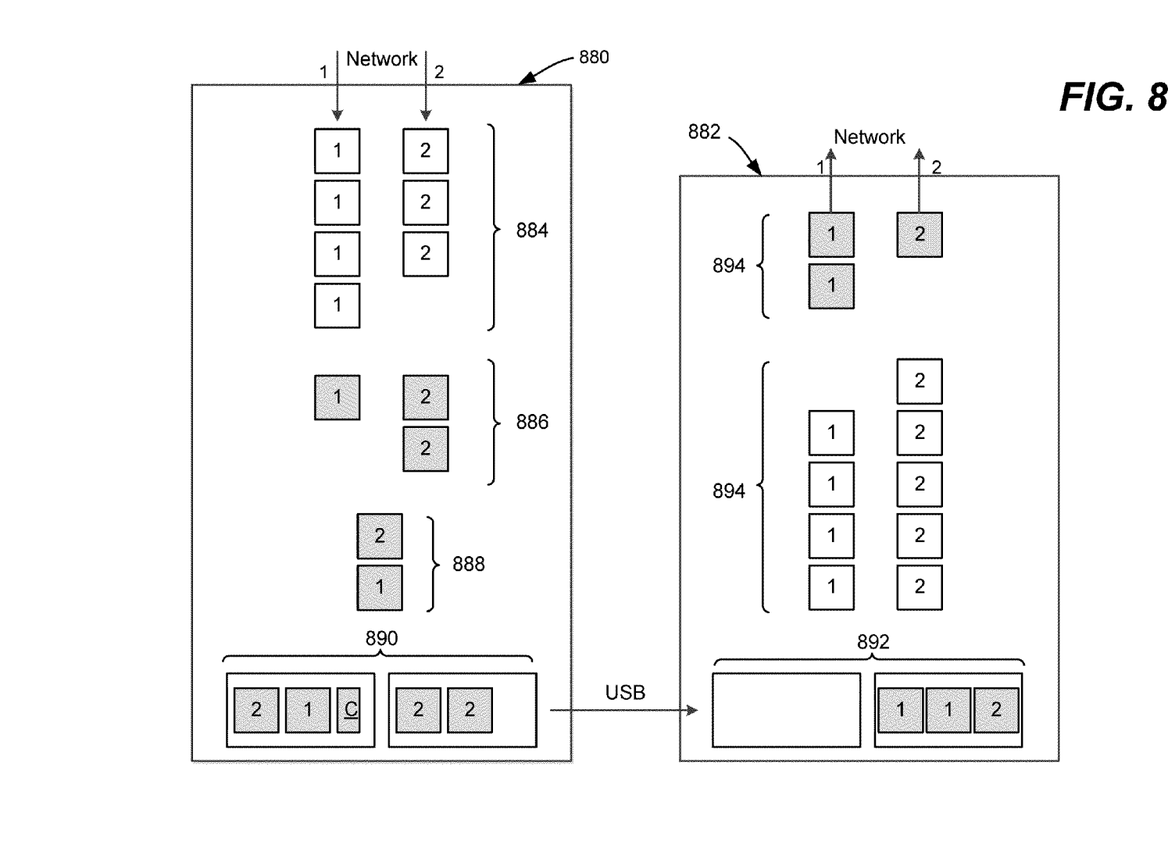
FIG. 8 is a block diagram representing example buffers and information illustrating the transferring of data from one network connection to another network connection with the data transferred via a point-to-point connection.

FIG. 8 shows an example with two active TCP connections (corresponding to "1" and "2") and how the data is sent from the left partner 880 to the right partner 882. As the TCP connections are bidirectional, the same is also happening in the other direction, (however this is not shown for simplicity). Blocks containing a "1" are for connection 1, blocks containing a "2" are for connection 2. Shaded blocks represent full buffers. In this example, six network buffers are used per connection, while two USB buffers are shared by the connections FIG. 8 shows an instant where network send, network receive, and USB send are taking place at the same time. The blocks labeled 884 represent receiving data from a network, the blocks labeled 886 represent waiting for network send buffers on the other partner device, and the blocks labeled 888 represent waiting for USB buffers on this partner device. The blocks labeled 890 represent waiting for USB transfer or ACK. The other partner's blocks labeled 892 represent a USB read buffer that is waiting for copy into network send buffers and start network send, the blocks labeled 894 represent free network send buffers, and the blocks labeled 896 represent buffers for sending data to the network.

The data owned by each proxy component is thus either in a network receive buffer, a USB buffer or a network send buffer in this example. For example, the proxy component has eight segments of data for the connection 2, three of them in network receive buffers (blocks 886 and 888) in the left partner, three of them already copied into the USB write buffers (blocks 890) in the left partner, one of them in the USB read buffer (blocks 892) in the right partner and one of them in the network send buffer (block 894) in the right partner.

In one implementation, a flow control mechanism guarantees that the data segments in the USB read buffer (block 892) can be copied into the network send buffers to start the network send operation and start a new USB read operation with the USB buffer. With this implementation, a reason for a USB read buffer to be full, as shown in FIG. 8, is not having CPU available to process it.

More particularly, network receive buffers are filled as much as possible with data received from the network. However, no more data can be sent to the partner than the send buffers that are present at the partner, and thus a flow control mechanism is implemented. For example, the partner that receives the data may be uploading the data to a site, which may be slow relative to the rate at which data may be received, and thus the data that is received is held at the delivering partner by the flow control mechanism In one implementation, a counter of pending deliveries is kept in the network receiver (the USB sender) as part of the flow control mechanism. This counter is incremented each time a write command (e.g., StreamWrite) is sent to the partner, and decremented each time a delivery command (e.g., DataDelivered) command is received from the partner. When the counter reaches the number of existing buffers, the received data is not sent to the partner, but rather held until the counter is decremented.

The data labeled "C" in the USB send buffer (block 890) represents a protocol command, for example an ACK or DataDelivered command; note that ACK and DataDelivered commands correspond to transfers from right to left and hence have no relation with the other data being transferred from left to right as shown FIG. 8. Further note that the ACK command need not be reliably sent (there is no ACK of an ACK, and if an ACK is lost this only results in a transfer being re-sent), however a DataDelivered command is reliably sent using an ACK (so that the counter is reliably maintained).

Turning to additional details of one example implementation, the number and size of the USB transfer buffers and the network connection buffers are configurable. If the configuration for a value is different between both sides, in one implementation, the minimum between them is used. Example values are:

| Value Name | Type | Default | Comments |
|---|---|---|---|
| PartnerTransferBuffers | dword | 4 | Min value is 1 |
| PartnerTransferBufferSize | dword | 16383 | This is also the min value |
| ConnectionBuffers | dword | 16 | Min value is 1 |
| ConnectionBufferSize | dword | 4000 | This is also the min value |

The proxy listens on the configured ports (if any). A port can be configured to use the SOCKS protocol to negotiate the destination or to go to a fixed mapped destination. A configuration is added for each port, with the following values provided:

| Value Name | Type | Comments |
|---|---|---|
| LocalPort | dword | Port to listen. Use 0 for a dynamic port number |
| DestinationAddress | sz | Only for mapped ports, usually "127.0.0.1" so connections go to the partner |
| DestinationPort | dword | Only for mapped ports |

In one implementation, commands are queued in three different queues, namely an unreliable commands queue, out-of-band reliable commands queue and in-band reliable commands queue. The unreliable commands queue is used for ACKs and handshake data. These commands are sent as soon as possible and if they are the only ones present in a transfer, the buffer is freed as soon as the transfer is complete. Having such a buffer ensures that there is room for an ACK to be sent, even if other buffers are full, which in turn can free other buffers for receipt of additional data transfers in the other side. This mechanism prevents a possible deadlock if both partners have their transfer buffers full.

The out-of-band reliable commands queue is used for DataDelivered (flow control-related) commands. Such a command takes precedence over in-band commands, but not over unreliable commands. The in-band reliable commands queue is for any other commands, which are sent in order whenever possible, with precedence given to the other kinds of commands.

In one implementation, there are two levels of buffers, one for network connections and the other for transport transfers (e.g., USB). In both cases read and write buffers are created and read and write operations are issued without waiting for the previous operation to complete. For example if there are four USB buffers, reads are issued for all of them, and re-issued after processing each read. Having the USB and the network stacks do interrupt-driven work improves the performance, as no execution time is needed on the proxy between transfers.

With respect to the transfer buffers, in one implementation, to avoid deadlocks, an extra unreliable write buffer is created for the transport. Transfer buffers may be filled with commands using the following algorithm:

```
If there are reliable commands waiting (in-band or out-of-band) and there
are also transfer buffers available
    Select a transfer buffer
Else if there are unreliable commands waiting and the unreliable buffer is
free
    Select the unreliable buffer
Fit as many unreliable commands as possible in the buffer
If the buffer selected is a transfer buffer
    Fit as many out-of-band commands as possible in the buffer
    Fit as many in-band commands as possible in the buffer
Notify data sent (network buffers that are now free) to the corresponding
connections
```

Because transfer reads are issued as soon as possible, the incoming transfers queue contains the incoming buffers, and they have active reads. When a read is complete, the first buffer is removed from the queue, processed, a new read is issued, and the buffer is added again to the end of the queue.

Buffers wait in an available outgoing transfers queue to be filled with commands. After putting the possible commands in the buffer, the transfer write is issued. Then the buffer goes to the pending transfers queue.

More particularly, the transfer pending completion and acknowledgement wait in a pending outgoing transfers queue. There is a thread waiting on the first transfer to be completed, and then for the corresponding ACK to be received if the transfer included reliable payload. After the write is complete (and the ACK received if it corresponds) the buffer is added back to the available transfers queue. If a timeout occurs when waiting for the ACK, the transfers in the queue are retransmitted, because a timeout in the first pending transfer can usually cause timeouts in the other pending transfers as well.

Send buffers are filled when data is received from the partner. Buffers wait in this queue until data is received, and then the data is copied from the read transfer buffer to one of the network send buffers. Then the network send is initiated and the buffer is put in the send filling queue.

Buffers in the send buffers filling queue are waiting for network send operations to complete. After the network send is complete, the buffer is put back in the previous queue and a data delivered message is generated. The reliability mechanism is performed on the USB transfer layer as described above. In the example shown in FIG. 8 there is no buffer in the left with the same information as the one in the right, what means that an ACK was already received for that data on the left partner and the USB buffer was already reutilized.

Exemplary Operating Environment

Figure 9:
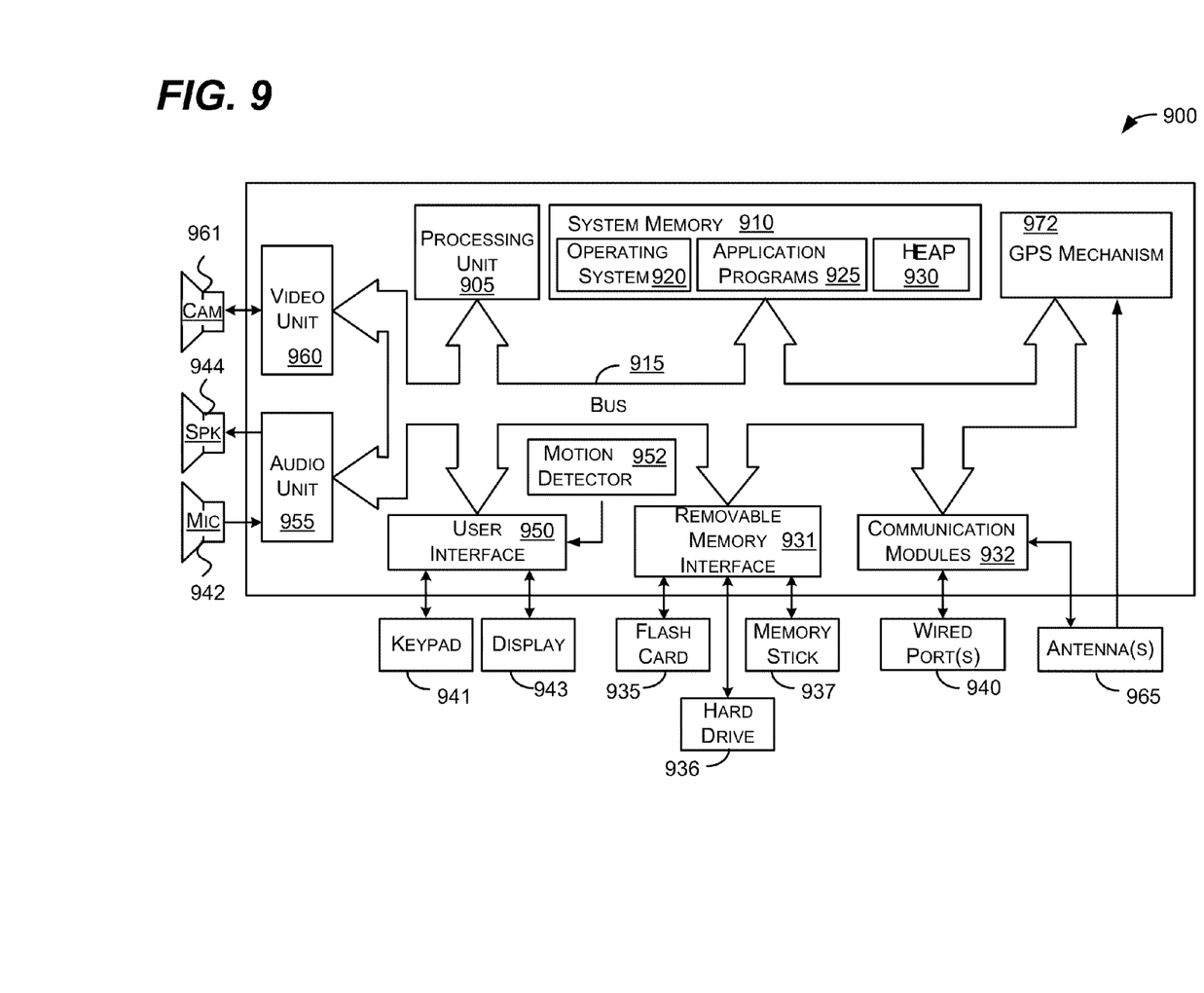
FIG. 9 is a block diagram representing an exemplary non-limiting computing system or operating environment, e.g., in the example of a mobile phone device, in which one or more aspects of various embodiments described herein can be implemented.

FIG. 9 illustrates an example of a suitable mobile device 900 on which aspects of the subject matter described herein may be implemented. The mobile device 900 is only one example of a device and is not intended to suggest any limitation as to the scope of use or functionality of aspects of the subject matter described herein. Neither should the mobile device 900 be interpreted as having any dependency or requirement relating to any one or combination of components illustrated in the exemplary mobile device 900.

With reference to FIG. 9, an exemplary device for implementing aspects of the subject matter described herein includes a mobile device 900. In some embodiments, the mobile device 900 comprises a cell phone, a handheld device that allows voice communications with others, some other voice communications device, or the like. In these embodiments, the mobile device 900 may be equipped with a camera for taking pictures, although this may not be required in other embodiments. In other embodiments, the mobile device 900 may comprise a personal digital assistant (PDA), hand-held gaming device, notebook computer, printer, appliance including a set-top, media center, or other appliance, other mobile devices, or the like. In yet other embodiments, the mobile device 900 may comprise devices that are generally considered non-mobile such as personal computers, servers, or the like.

Components of the mobile device 900 may include, but are not limited to, a processing unit 905, system memory 910, and a bus 915 that couples various system components including the system memory 910 to the processing unit 905. The bus 915 may include any of several types of bus structures including a memory bus, memory controller, a peripheral bus, and a local bus using any of a variety of bus architectures, and the like. The bus 915 allows data to be transmitted between various components of the mobile device 900.

The mobile device 900 may include a variety of computer-readable media. Computer-readable media can be any available media that can be accessed by the mobile device 900 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 900.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, WiFi, WiMAX, and other wireless media. Combinations of any of the above should also be included within the scope of computer-readable media.

The system memory 910 includes computer storage media in the form of volatile and/or nonvolatile memory and may include read only memory (ROM) and random access memory (RAM). On a mobile device such as a cell phone, operating system code 920 is sometimes included in ROM although, in other embodiments, this is not required. Similarly, application programs 925 are often placed in RAM although again, in other embodiments, application programs may be placed in ROM or in other computer-readable memory. The heap 930 provides memory for state associated with the operating system 920 and the application programs 925. For example, the operating system 920 and application programs 925 may store variables and data structures in the heap 930 during their operations.

The mobile device 900 may also include other removable/non-removable, volatile/nonvolatile memory. By way of example, FIG. 9 illustrates a flash card 935, a hard disk drive 936, and a memory stick 937. The hard disk drive 936 may be miniaturized to fit in a memory slot, for example. The mobile device 900 may interface with these types of non-volatile removable memory via a removable memory interface 931, or may be connected via a universal serial bus (USB), IEEE 9394, one or more of the wired port(s) 940, or antenna(s) 965. In these embodiments, the removable memory devices 935-937 may interface with the mobile device via the communications module(s) 932. In some embodiments, not all of these types of memory may be included on a single mobile device. In other embodiments, one or more of these and other types of removable memory may be included on a single mobile device.

In some embodiments, the hard disk drive 936 may be connected in such a way as to be more permanently attached to the mobile device 900. For example, the hard disk drive 936 may be connected to an interface such as parallel advanced technology attachment (PATA), serial advanced technology attachment (SATA) or otherwise, which may be connected to the bus 915. In such embodiments, removing the hard drive may involve removing a cover of the mobile device 900 and removing screws or other fasteners that connect the hard drive 936 to support structures within the mobile device 900.

The removable memory devices 935-937 and their associated computer storage media, discussed above and illustrated in FIG. 9, provide storage of computer-readable instructions, program modules, data structures, and other data for the mobile device 900. For example, the removable memory device or devices 935-937 may store images taken by the mobile device 900, voice recordings, contact information, programs, data for the programs and so forth.

A user may enter commands and information into the mobile device 900 through input devices such as a key pad 941 and the microphone 942. In some embodiments, the display 943 may be touch-sensitive screen and may allow a user to enter commands and information thereon. The key pad 941 and display 943 may be connected to the processing unit 905 through a user input interface 950 that is coupled to the bus 915, but may also be connected by other interface and bus structures, such as the communications module(s) 932 and wired port(s) 940. Motion detection 952 can be used to determine gestures made with the device 900.

A user may communicate with other users via speaking into the microphone 942 and via text messages that are entered on the key pad 941 or a touch sensitive display 943, for example. The audio unit 955 may provide electrical signals to drive the speaker 944 as well as receive and digitize audio signals received from the microphone 942.

The mobile device 900 may include a video unit 960 that provides signals to drive a camera 961. The video unit 960 may also receive images obtained by the camera 961 and provide these images to the processing unit 905 and/or memory included on the mobile device 900. The images obtained by the camera 961 may comprise video, one or more images that do not form a video, or some combination thereof.

The communication module(s) 932 may provide signals to and receive signals from one or more antenna(s) 965. One of the antenna(s) 965 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 972. In turn, the GPS mechanism 972 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 900 may connect to one or more remote devices. The remote devices may include a personal computer, a server, a router, a network PC, a cell phone, a media playback device, a peer device or other common network node, and typically includes many or all of the elements described above relative to the mobile device 900.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system comprising:
   a first computing device coupled to a second computing device via a point-to-point connection, the point-to-point connection corresponding to an unreliable transfer mechanism, in which the point-to-point connection is not through any of a wired Ethernet connection, a wireless router, or a wireless access point;
   the first computing device including a first proxy component configured to:
   process internet protocol (IP)-based network data for transmission over the point-to-point connection via a reliable protocol to a second proxy component of the second computing device; and
   receive an acknowledgement (ACK) from an ACK mechanism of the reliable protocol in response to the IP-based network data being correctly received by the second proxy component, wherein the ACK is received from the second proxy component where data received via the reliable protocol are processed into the IP-based network data.

2. The system of claim 1, wherein the first proxy component and second proxy component are bi-directional proxy components that are each configured to process received data and to process data for sending.

3. The system of claim 1, wherein the first proxy component is further configured to:
   in response to no ACK being returned within a timeout period, re-send the (IP)-based network data over the point-to-point connection via the reliable protocol.

4. The system of claim 1, wherein the ACK is received from the second computing device in response to the received data being correctly received at the second computing device based upon at least one of a sequence number or a checksum.

5. The system of claim 1, further comprising:
   a flow control mechanism, in which the second computing device returns information to the first computing device that indicates when received data has been delivered to a network recipient and that a network buffer is available for buffering more data received via the point-to-point connection.

6. The system of claim 1, wherein the first proxy component contains an unreliable commands queue for ACK commands, an out-of-band reliable commands queue for flow control commands, and an in-band reliable commands queue for other commands.

7. The system of claim 1, wherein the point-to-point connection comprises a universal serial bus (USB)-based connection, or an IEEE 1394-based connection.

8. The system of claim 1, wherein the point-to-point connection comprises a shared memory connection into a virtual device.

9. The system of claim 1, wherein the first proxy component processes the IP-based network data into a data transfer container for transmission, including associating an identifier with the data transfer container.

10. The system of claim 9, the first computing device further configured to determine whether the data transfer container was correctly received by the second computing device, including by determining that the received ACK from the second computing device includes information corresponding to the identifier associated with the data transfer container.

11. The system of claim 9, wherein the data transfer container comprises a packet, wherein associating the identifier with the data transfer container comprises including a packet sequence number in the packet, and wherein determining that the data was correctly received comprises evaluating the packet sequence number based on any previously received sequence numbers to determine that the packet was received in a correct sequence.

12. In a computing environment, a method comprising:
    receiving, by a first computing device, internet protocol (IP)-based network data, wherein the first computing device is coupled to a second computing device via a point-to-point connection over an unreliable transport mechanism, wherein the point-to-point connection is not through any of a wired Ethernet connection, a wireless router, or a wireless access point;
    processing, by a first proxy component of the first computing device, the IP-based network data for transmission over the point-to-point connection via a reliable protocol;
    transmitting the IP-based network data over the point-to-point connection via the reliable protocol to a second proxy component of the second computing device; and
    receiving an acknowledgement (ACK) from an ACK mechanism of the reliable protocol in response to the IP-based network data being correctly received by the second proxy component.

13. The method of claim 12, wherein data received via the reliable protocol are processed into the IP-based network data by the second proxy component.

14. The method of claim 13, further comprising:
    receiving, by the first computing device, information from the second computing device that indicates when received data has been delivered to a network recipient.

15. The method of claim 13, further comprising:
    receiving, by the first computing device, information from the second computing device that indicates a network buffer is available for buffering more data received via the point-to-point connection.

16. The method of claim 12, wherein the point-to-point connection comprises a universal serial bus (USB)-based connection, or an IEEE 1394-based connection.

17. One or more computer storage media having computer-executable instructions, which when executed perform steps, comprising:
    receiving, by a first computing device, internet protocol (IP)-based network data from a second computing device via a reliable protocol over an unreliable transport mechanism of a point-to-point connection, wherein the reliable protocol includes an acknowledgement (ACK) mechanism configured to return an ACK to the second computing device in response to the IP-based network data being correctly received by the first computing device, and wherein the point-to-point connection is not through any of a wired Ethernet connection, a wireless router, or a wireless access point;
    processing, by a first proxy component of the first computing device, the received IP-based network data; and
    transmitting other IP-based network data to a second proxy component of the second computing device via the reliable protocol over the unreliable transport mechanism.

18. The one or more computer storage media of claim 17, wherein the second proxy component is configured to process the data received via the reliable protocol into IP-based network data.

19. The one or more computer storage media of claim 18, having further computer-executable instructions comprising:
receiving, by the first computing device, information from the second computing device that indicates when received data has been delivered to a network recipient.

20. The one or more computer storage media of claim 18, having further computer-executable instructions comprising:
receiving, by the first computing device, information from the second computing device that indicates a network buffer is available for buffering more data received via the point-to-point connection.

\* \* \* \* \*